(12) United States Patent
Khajepour et al.

(10) Patent No.: US 7,218,035 B2
(45) Date of Patent: May 15, 2007

(54) MICRO-POSITIONING DEVICE

(75) Inventors: Amir Khajepour, Waterloo (CA); Kirsten Morris, Guelph (CA); Sara Behjat, Waterloo (CA)

(73) Assignee: University of Waterloo, Waterloo, ON (CA)

( * ) Notice: Subject to any disclaimer, the term of this patent is extended or adjusted under 35 U.S.C. 154(b) by 152 days.

(21) Appl. No.: 10/529,007

(22) PCT Filed: Sep. 29, 2003

(86) PCT No.: PCT/CA03/01487

§ 371 (c)(1), (2), (4) Date: Mar. 24, 2005

(87) PCT Pub. No.: WO2004/030196

PCT Pub. Date: Apr. 8, 2004

(65) Prior Publication Data

US 2006/0049718 A1    Mar. 9, 2006

(51) Int. Cl.
*H01L 41/08*    (2006.01)
(52) U.S. Cl. .................................... 310/328
(58) Field of Classification Search ........... 310/328
See application file for complete search history.

(56) References Cited

U.S. PATENT DOCUMENTS

| | | | |
|---|---|---|---|
| 3,902,084 A | 8/1975 | May | |
| 3,902,085 A | 8/1975 | Bizzigotti | |
| 3,939,777 A | 2/1976 | Moran | |
| 4,219,755 A * | 8/1980 | O'Neill et al. ............. | 310/348 |
| 4,709,183 A | 11/1987 | Lange | |
| 4,725,002 A | 2/1988 | Trachte | |
| 4,736,131 A | 4/1988 | Fujimoto | |
| 4,803,393 A * | 2/1989 | Takahashi .................... | 310/328 |
| 5,285,689 A | 2/1994 | Hapstack et al. | |
| 5,286,199 A * | 2/1994 | Kipke ........................ | 434/114 |
| 5,319,257 A | 6/1994 | McIntyre | |
| 5,589,725 A | 12/1996 | Haertling | |
| 5,662,020 A | 9/1997 | Morita et al. | |
| 5,662,587 A | 9/1997 | Grundfest et al. | |
| 5,697,554 A | 12/1997 | Auwaerter et al. | |

(Continued)

FOREIGN PATENT DOCUMENTS

DE    35 33 085    3/1987

(Continued)

OTHER PUBLICATIONS

Article entitled "A New Inchworm Mechanism with Hydraulic Booster", by S. Behjat, A. Khajepour and K. Morris, dated Oct. 2, 2002.

(Continued)

*Primary Examiner*—Mark Budd

(57) ABSTRACT

A micro-positioning device adapted for displacement in a direction of travel. The device has a frame, an actuator attached to the frame, and a hydraulic booster attached to the frame and operably connected to the actuator. The actuator is adapted for activation and de-activation in sequence to achieve a displacement in the direction of travel. The hydraulic booster is adapted for amplifying or de-amplifying displacement in the direction of travel. The hydraulic booster converts mechanical energy into hydraulic energy and converts hydraulic energy into mechanical energy to modify the displacement.

14 Claims, 6 Drawing Sheets

U.S. PATENT DOCUMENTS

| | | | |
|---|---|---|---|
| 6,034,466 A * | 3/2000 | Blanding et al. | 310/328 |
| 6,039,505 A | 3/2000 | Tenbusch | |
| 6,062,532 A | 5/2000 | Gurich et al. | |
| 6,178,872 B1 | 1/2001 | Schulz | |
| 6,184,609 B1 | 2/2001 | Johansson et al. | |
| 6,194,812 B1 * | 2/2001 | Klugl et al. | 310/328 |
| 6,380,661 B1 | 4/2002 | Henderson et al. | |
| 6,429,573 B2 | 8/2002 | Koopmann et al. | |

FOREIGN PATENT DOCUMENTS

| | | |
|---|---|---|
| DE | 198 44 518 | 4/2000 |
| EP | 0 477 400 | 4/1992 |
| WO | WO 93/06625 | 4/1993 |

OTHER PUBLICATIONS

International Search Report, PCT/CA03/01487, dated Sep. 13, 2004.

* cited by examiner

MICRO-POSITIONING DEVICE

FIELD OF THE INVENTION

This invention relates to micro-positioning devices.

BACKGROUND OF THE INVENTION

Various micro-positioning devices for generating motion are known, such as linear incremental motors or other incremental motors. As is known, a micro-positioning device includes at least one actuator comprising a "smart" material, i.e., piezoelectric materials, magnetostrictive materials, and other materials known in the art. For example, in a typical linear incremental motor (or "inchworm" device), one or more actuators typically is arranged in such a way and activated and de-activated in such a sequence as to cause the motor to take a large number of relatively small steps very quickly. Where piezoelectric actuators are used, for example, the activation is effected by way of applying appropriate voltages in an appropriate sequence.

A typical inchworm mechanism 20 is shown in FIG. 1A, and a typical complete cycle of activations and de-activations for the inchworm mechanism 20 is schematically shown in FIG. 1B. (As will be described, the remainder of the drawings illustrate the present invention.) The motion of the inchworm mechanism 20 along a guideway 21 is created by a sequence of signals fed into piezoelectric actuators 22, 24, 26 which are attached to a frame 28, and which are used for clamping and longitudinal extension. As shown in FIG. 1A, a first actuator 22 and a second actuator are attached at opposite ends 29, 30 of the frame 28, and a middle actuator 24 is positioned lengthwise between the first and second actuators 22, 26.

As is known in the art, a full cycle is composed of six steps, shown in FIG. 1B. In FIG. 1B only the actuators are shown, and shaded actuators are activated. Other actuators shown in FIG. 1B are not activated. For example, the six steps shown in FIG. 1B would result in movement in the direction of the arrow X. Such movement is generated as follows.

In the first step, the first actuator 22 is activated, causing a clamp connected thereto to clamp to the guideway 21. The middle actuator 24 is elongate, and the further elongation of the middle actuator 24 (i.e., upon activation thereof) while the first actuator 24 is activated results in the second end 30 being extended further away from the first end 29 in step 2 than in step 1 (see step 2 in FIG. 1B). In the third step, the second actuator 26 is activated, causing another clamp to clamp to the guideway 21. In the fourth step, the first actuator 22 is de-activated, causing the clamp associated therewith to release. In step 5, the middle actuator 24 is de-activated, allowing movement (i.e., displacement) of the first end 29 towards the second end 30. The direction of motion (shown by arrow X in FIG. 1B) can be changed by reversing the sequence of activations.

However, known micro-positioning devices are unable to operate at speeds which are necessary or desirable for various applications. As is known in the art, the speed of a micro-positioning device can be increased by increasing step size or increasing operating frequency of the device, or both. Higher structural stiffness of the device is desirable, as higher stiffness leads to operation at higher natural frequencies. Therefore, although increasing step size—i.e., amplifying the stroke—is desirable, it is at the same time desirable to maintain stiffness of the device.

Increasing the step size by means of including mechanical levers in a linear incremental motor has been found to be unsatisfactory because adding mechanical levers decreases the stiffness of the motor. For example, see P. E. Tenzer and R. Ben Mrad, "Amplification in Inchworm Precision Positioners", Proceedings, 2nd CanSmart Workshop on Smart Materials and Structures, Montreal, Canada, 2001, pp. 77–84.

Although amplifying the stroke (or displacement) in a micro-positioning device is desirable in certain circumstances, de-amplifying the stroke can also be desirable. For example, at present, the closed-loop accuracy of known micro-positioning devices is limited by the accuracy of sensors in the known micro-positioning devices. De-amplification could be useful to improve closed-loop accuracy of micro-positioning devices.

It is therefore desirable to provide a micro-positioning device adapted for displacement in a direction of travel which includes a means for modifying the displacement.

SUMMARY OF THE INVENTION

In a broad aspect of the present invention, there is provided a micro-positioning device adapted for displacement in a direction of travel. The device includes a frame, an actuator attached to the frame, and a hydraulic booster attached to the frame and operably connected to the actuator. The actuator is adapted for activation and de-activation in sequence so as to effect the displacement of the device. The hydraulic booster is adapted for amplifying or de-amplifying displacement in the direction of travel. The hydraulic booster converts mechanical energy into hydraulic energy and converts hydraulic energy into mechanical energy to modify the displacement.

In another aspect of the present invention, there is provided a micro-positioning device adapted for movement along a guideway in a direction of travel. The device has a frame, an actuator, and a hydraulic booster. The actuator is attached to the frame and adapted for activation to achieve a displacement of the device in the direction of travel. The hydraulic booster is also attached to the frame and operably connected to the actuator, and is adapted for converting mechanical energy into hydraulic energy and converting hydraulic energy into mechanical energy upon activation of the actuator, to modify the displacement.

In another aspect of the present invention, the hydraulic booster includes a housing and a fluid in a cavity defined by the housing. The housing includes an input portion adjacent to the actuator, the input portion being adapted to cooperate with the fluid to convert mechanical energy produced by the actuator upon activation thereof into hydraulic energy. The housing additionally includes an output portion adapted to convert the hydraulic energy into mechanical energy to modify the displacement. Also, the input portion has an input contact area over which the input portion is in contact with the fluid, and the output portion has an output contact area over which the output portion is in contact with the fluid. The input contact area is greater than the output contact area, so that the hydraulic booster is adapted to amplify the displacement.

In yet another aspect, the input contact area is less than the output contact area, so that the hydraulic booster is adapted to de-amplify the displacement.

In yet another aspect, there is provided a micro-positioning device adapted for movement along a guideway, the device having a frame, three actuators, and a hydraulic booster. The frame has first and second opposing ends and a middle portion positioned therebetween. Two of the actuators are attached to the frame at the first and second ends thereof respectively, and the other actuator is positioned in the middle portion of the frame. The three actuators are adapted for activation and de-activation in synchronism to achieve a linear displacement of the device in a direction of travel along the guideway. The device also includes two clamps, positioned respectively at the first and second ends of the frame and operably connected respectively to the actuators positioned at the opposing ends. Each of the clamps is adapted for clamping to the guideway upon activation of the actuator connected thereto respectively and releasing upon de-activation of the respective actuator. The hydraulic booster is attached to the frame and connected to the middle actuator. The hydraulic booster is adapted for converting mechanical energy into hydraulic energy and converting the hydraulic energy into mechanical energy upon activation of the middle actuator, to modify the displacement.

BRIEF DESCRIPTION OF THE DRAWINGS

The invention will be better understood with reference to the drawings, in which.

DETAILED DESCRIPTION OF THE PREFERRED EMBODIMENT(S)

Figure 1A:
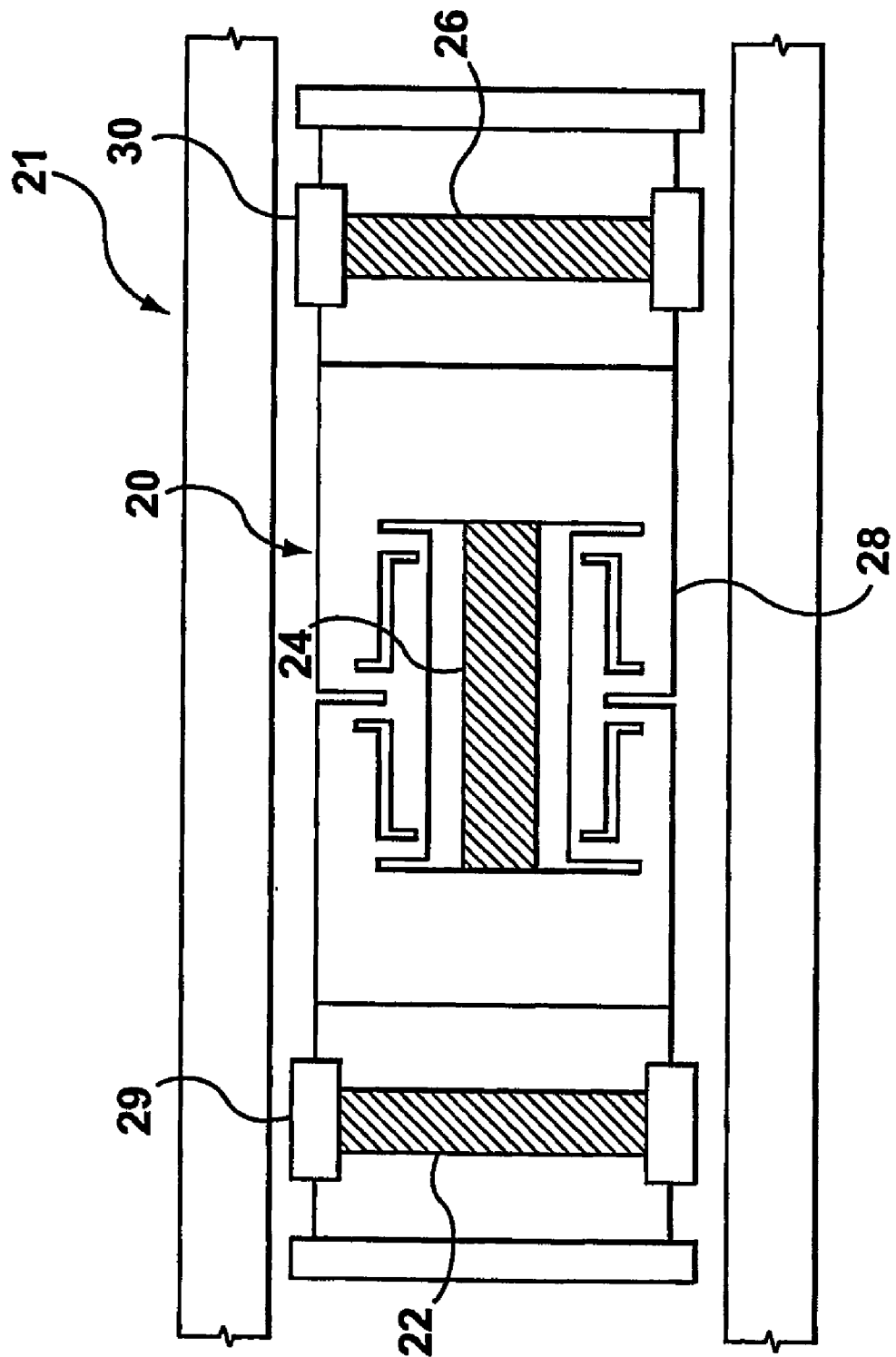
FIG. 1A (also described previously) is a schematic view of a linear incremental motor of the prior art.
Figure 1B:
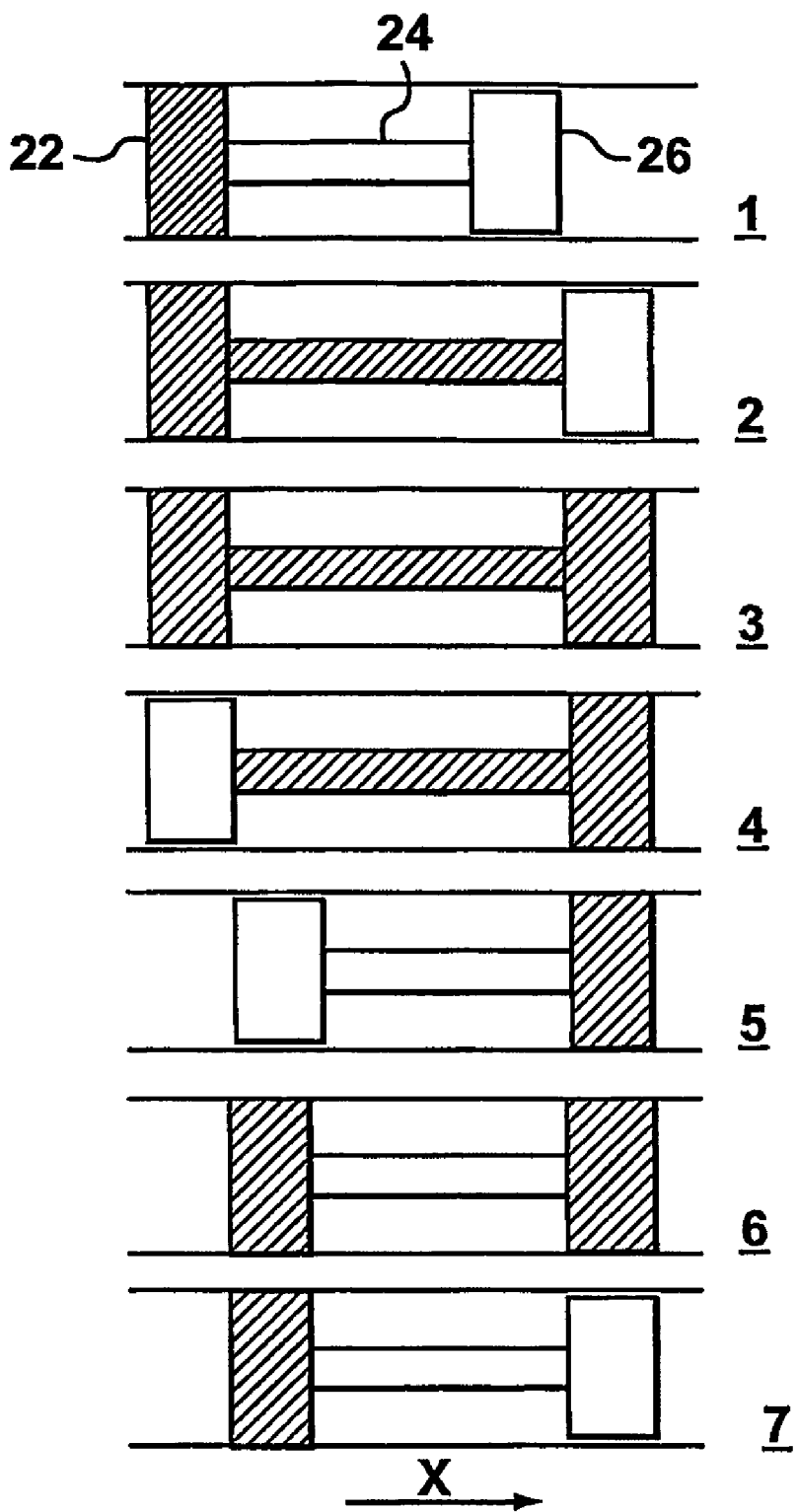
FIG. 1B (also described previously) is a schematic view showing a cycle of activations and de-activations in the linear incremental motor of the prior art shown in FIG. 1A.
Figure 2A:
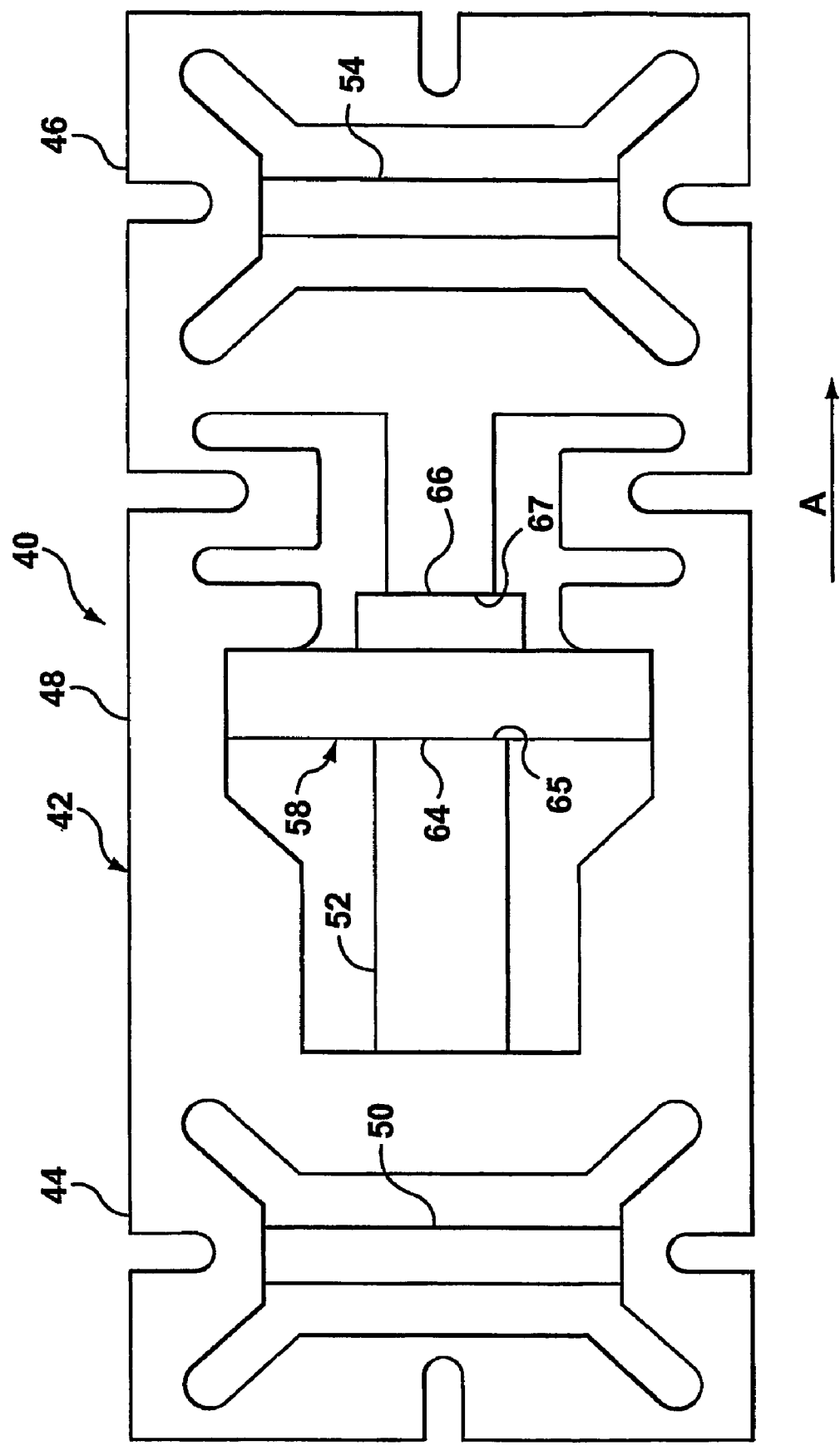
FIG. 2A is a schematic view of a preferred embodiment of the micro-positioning device, including a frame, three actuators positioned on the frame, and a hydraulic booster positioned on the frame.
Figure 2B:
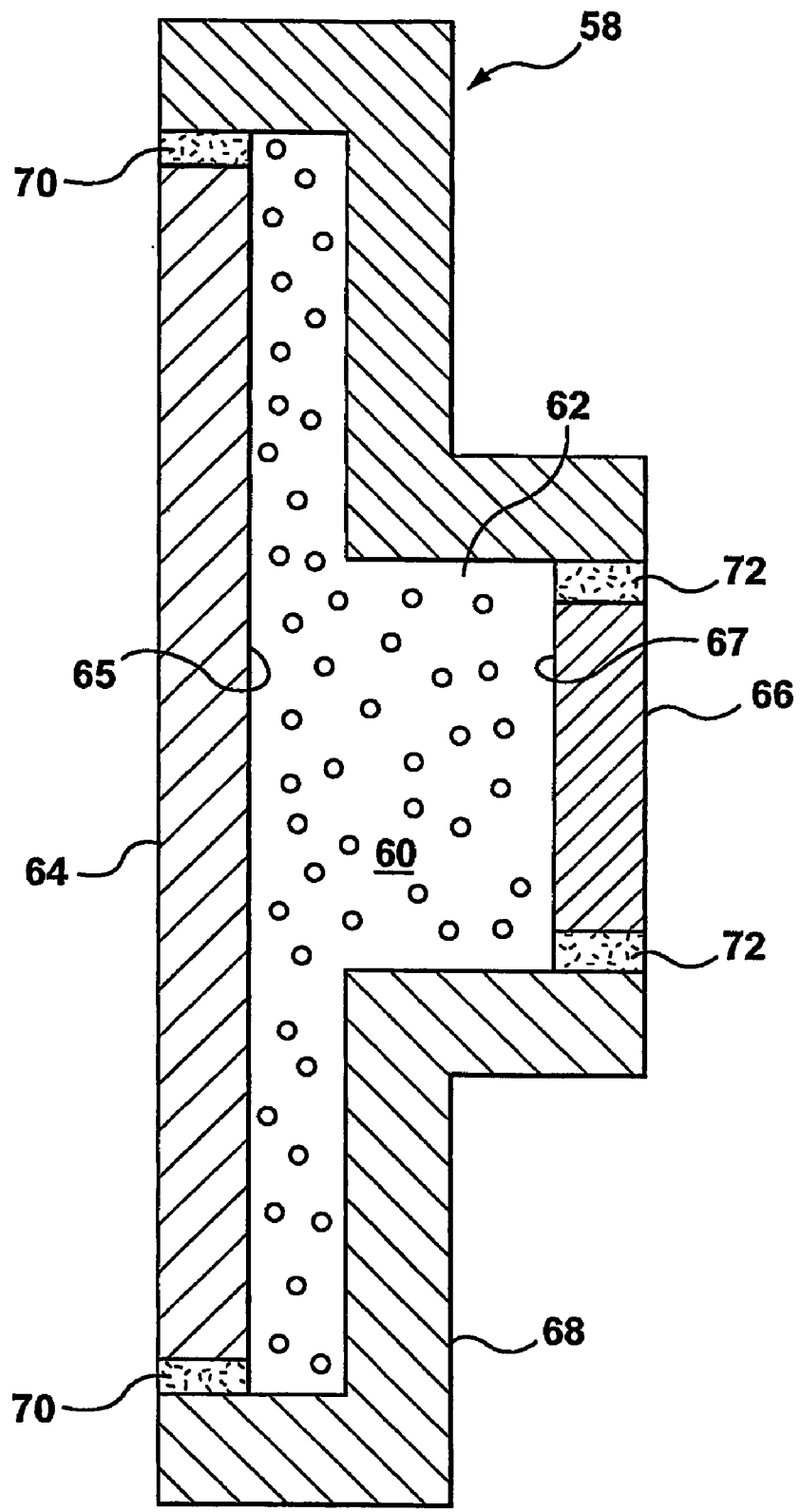
FIG. 2B is a cross-section of the hydraulic booster in the micro-positioning device of FIG. 2A, drawn at a larger scale.

Reference is first made to FIGS. 2A and 2B to describe a preferred embodiment of a micro-positioning device indicated generally by the numeral 40 in accordance with the invention.

As can be seen in FIG. 2A, the device 40 has a frame 42 having first and second opposing ends 44, 46 and a middle portion 48 positioned therebetween. The device 40 also includes three actuators 50, 52, 54. A first actuator 50 and a second actuator 54 are attached to the frame 42 at the first and second ends 44, 46 respectively. Also, a middle actuator 52 is positioned in the middle portion 48. As is known in the art, the three actuators 50, 52, 54 are adapted for activation and de-activation in synchronism to achieve a linear displacement in a direction of travel along a guideway (not shown). The device 40 also includes clamps (not shown) positioned at the first and second ends 44, 46 respectively and operably connected respectively to the first and second actuators 50, 54 positioned at the first and second ends 44, 46, as is known in the art. Each of the clamps is adapted for clamping to the guideway upon activation of the actuator 50,54 connected thereto (whether the first actuator 50 or the second actuator 54, as the case may be), and for releasing the guideway upon de-activation, to permit motion of the frame 42 relative to the guideway. The device 40 also includes a hydraulic booster 58 attached to the frame 42 and operably connected to the middle actuator 52. Preferably, the hydraulic booster 58 is directly connected to the middle actuator 52, as shown in FIG. 2A. As will be described, the hydraulic booster 58 is adapted for converting mechanical energy into hydraulic energy and converting the hydraulic energy into mechanical energy upon activation of the middle actuator 52, so that the hydraulic booster 58 modifies the displacement. Such conversions of energy are almost instantaneous.

For example, a direction of travel is shown by arrow A in FIG. 2A. It will be appreciated, however, that the actuators in the micro-positioning device 40 can also be so activated as to move in an alternative direction of travel opposite to the direction shown by arrow A, as is known in the art.

As can be seen in FIG. 2B, the hydraulic booster 58 preferably includes a fluid 60 in a cavity 62 defined by at least two opposing pistons 64, 66 and a wall portion 68. In the preferred embodiment, each of the pistons 64, 66 is connected to the wall portion 68 by resilient elements 70, 72 respectively. Upon activation of the middle actuator 52, the resilient elements 70, 72 are deflected from static positions to deformed positions respectively, and due to the resilience of the resilient elements 70, 72, the resilient elements rapidly return to the static positions.

As shown in FIGS. 2A and 2B, the piston 64, an input piston, is operably connected to the middle actuator 52. The piston 66, an output piston, is preferably positioned distal from the middle actuator 52. As can also be seen in FIGS. 2A and 2B, the input piston 64 has a contact area 65 which is in contact with the fluid 60. The contact area 65 is substantially greater than a contact area 67 of the output piston 66 which is in contact with the fluid 60. The difference between the contact areas 65 and 67 is such that activation of the middle actuator 54, resulting in conversion of mechanical energy into hydraulic energy and conversion of hydraulic energy into mechanical energy by the hydraulic booster 58, thereby also results in amplification of the displacement.

In accordance with the foregoing, in the preferred embodiment, the hydraulic booster 58 is an amplifier which increases the linear displacement caused by elongation of the middle actuator 52, upon activation of the middle actuator 52. The hydraulic booster 58 is incorporated into and secured to the structure of the frame 42. The amplification factor is equal to the ratio of the contact area 65 (i.e., the contact area of the input piston 64) to the contact area 67 (i.e., the contact area of the output piston 66). Since the fluid 60 in the hydraulic booster 58 is virtually incompressible, the overall stiffness of the device 40 is virtually the same as the overall stiffness of an inchworm mechanism 20 of the prior art, which lacks a hydraulic booster.

To prevent cavitation in the fluid 60, in the preferred embodiment, the hydraulic booster 58 is compressed by the stiffness of the frame 42. When the middle actuator 52 is activated, the amplified displacement (i.e., in the direction shown by the arrow A in FIG. 2A) at the output piston 66 moves the second end 46 relative to the first end 44 and also stores elastic energy in the frame 42. Once the second actuator 54 is activated (thereby causing the clamp associated therewith to clamp to the guideway) and the first actuator 50 and the middle actuator 52 are de-activated, the stored energy in the frame 42 is released and pulls the first end 44 towards the second end 46, i.e., resulting in displacement in the direction of arrow A in FIG. 2A.

INDUSTRIAL APPLICABILITY

In use, first, the first actuator 50 is activated, causing the clamp operably connected therewith to clamp to the guideway. The first end 44 is thus secured relative to the guideway. Next, the middle actuator 52 is activated, causing the device 40 to be elongated thereby, i.e., causing movement (displacement) of the second end 46 relative to the first end 44. More particularly, such relative movement of the second end 46 is a movement thereof away from the first end 44.

In the preferred embodiment, the displacement is modified due to the contact area 65 of the input piston 64 being greater than the contact area 67 of the output piston 66. Upon activation of the middle actuator 52, the input piston 64 is urged towards the output piston 66 by the middle actuator 52. Preferably, the input piston 64 is substantially rigid, but elastic energy can be stored in resilient elements 70. The movement of the input piston 64 inwardly (i.e., in the direction of arrow A in FIG. 2A) results in the contact area 65 pushing upon the fluid 60, which in turn pushes on the contact area 67 of the output piston 66. The output piston 66 is also preferably substantially rigid but held in place by resilient elements 72, which permit the output piston 66 to push towards the second end 48 (i.e., in the direction of arrow A in FIG. 2A). In particular, after activation of the middle actuator 52, and before activation of the second actuator 54, the second end 46 is urged further by the output piston 66 in the direction shown by arrow A. In addition, the displacement at the output piston 66 also stores elastic energy in the frame 42.

In the next step, the second actuator 54 is activated, resulting in the clamp operably connected therewith clamping to the guideway. Due to this, the second end 46 is secured to the guideway.

The next step involves de-activation of the first actuator 50. After de-activation of the first actuator 50, de-activation of the middle actuator 52 permits movement (i.e., displacement) of the first end 44 relative to the second end 46—i.e., the first end 44 moves closer to the second end 46. Upon de-activation of the first actuator 50 and the middle actuator 52 as aforesaid, the stored (elastic) energy in the frame 42 is released and the first end 44 and the middle portion 48 of the frame 42 are displaced in the direction of travel shown by arrow A in FIG. 2A.

Figure 3A:
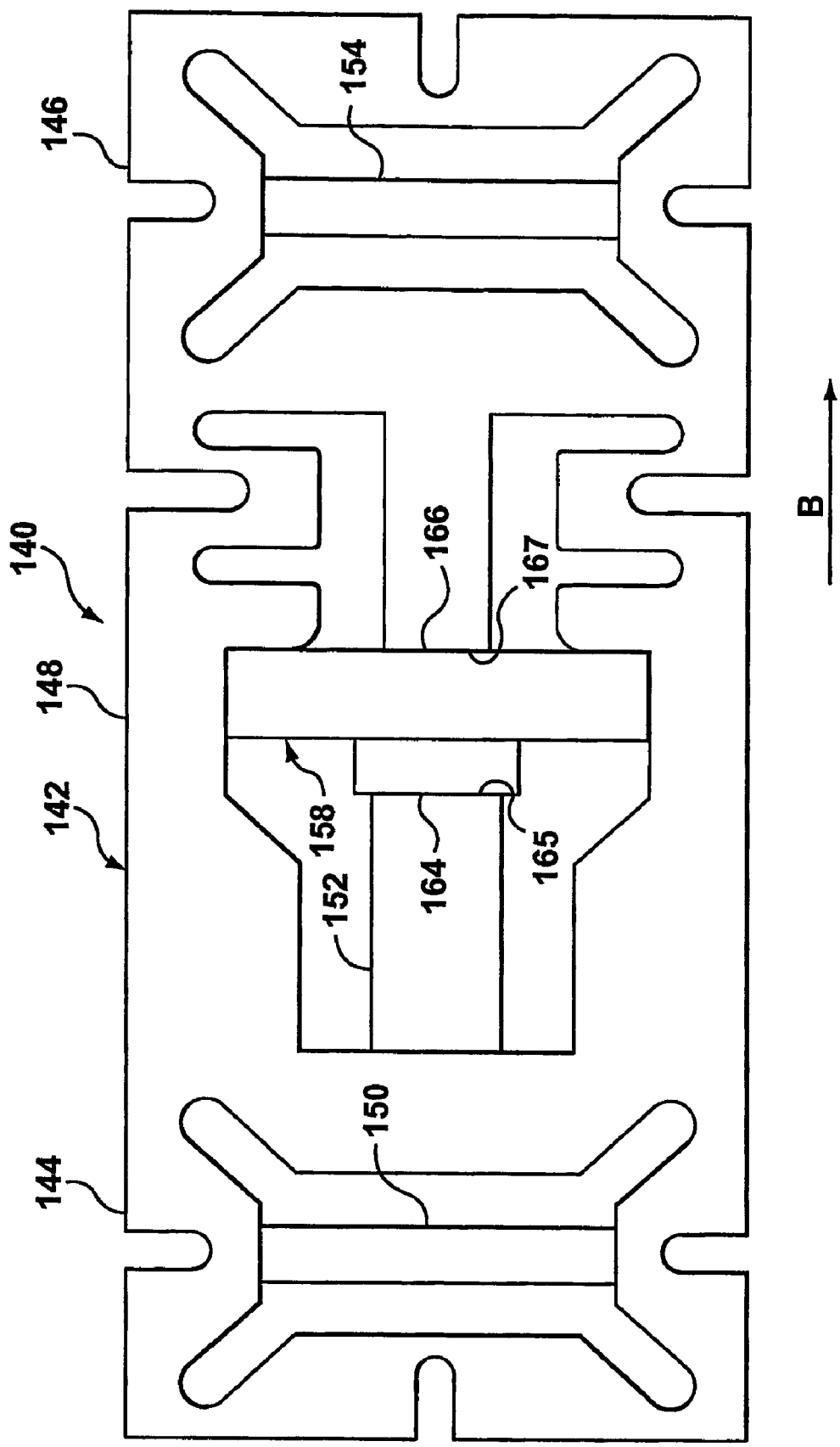
FIG. 3A is a schematic view of another embodiment of a micro-positioning device according to the invention, drawn at a smaller scale.
Figure 3B:
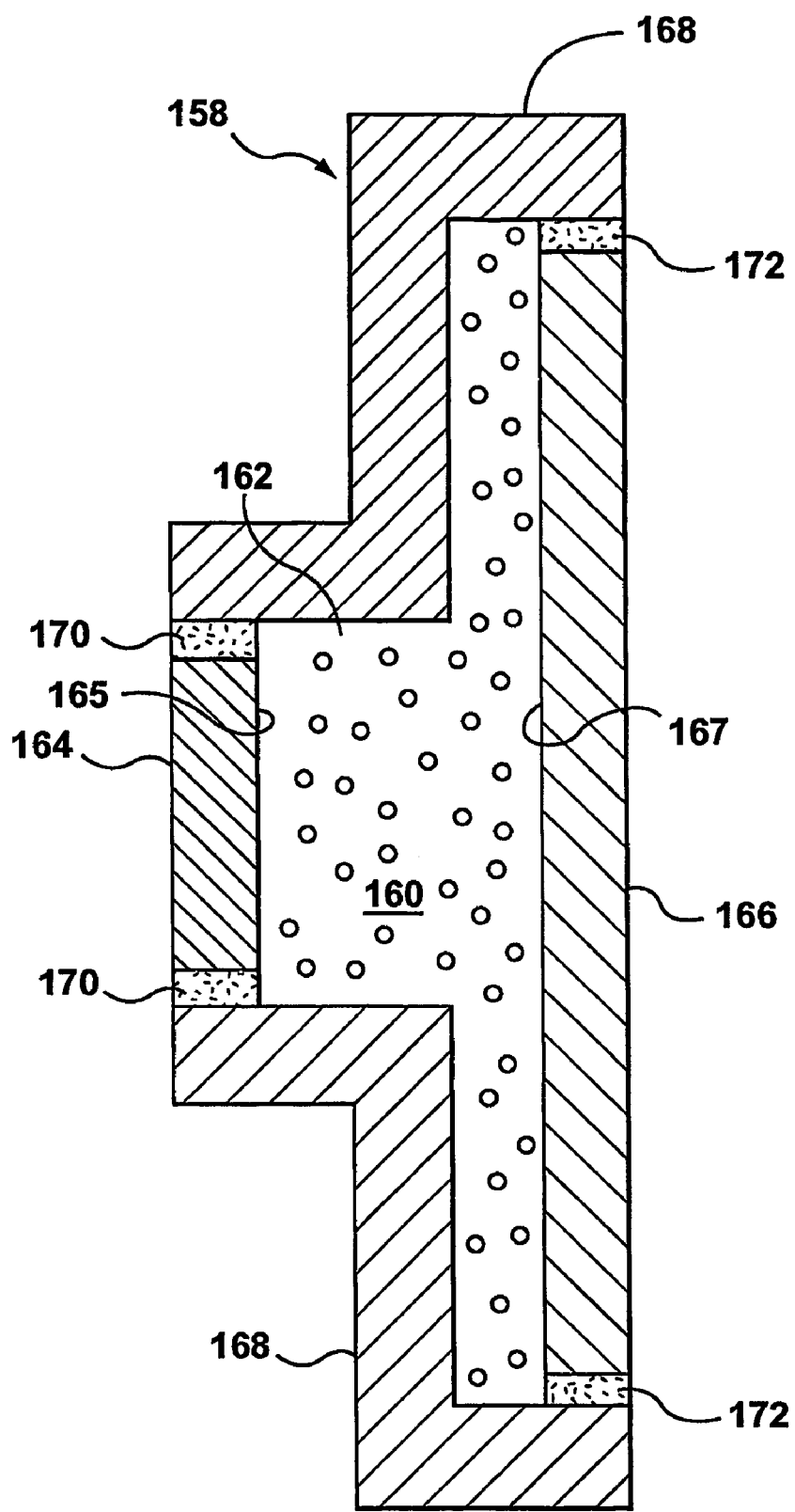
FIG. 3B is a cross-section of the hydraulic booster in the micro-positioning device of FIG. 3A, drawn at a larger scale.

Another embodiment 140 of the device of the invention is schematically shown in FIGS. 3A and 3B. In FIGS. 3A and 3B, elements are numbered so as to correspond to like elements shown in FIGS. 2A and 2B.

In FIG. 3A the device 140 includes a hydraulic booster 158 (FIG. 3B). Preferably, the hydraulic booster 158 has an input piston 164 having a contact area 165 in contact with the fluid 60. The hydraulic booster 158 also has an output piston 166, which has a contact area 167. However, in the hydraulic booster 158, the contact area 165 of the input piston 164 is less than the contact area 167 of the output piston 166. Because the amplification factor is equal to the ratio of the input piston's contact area 165 to the output piston's contact area 167, it can be seen that, in the micro-positioning device 140, the hydraulic booster 158 causes de-amplification of the displacement in the direction shown by arrow B in FIG. 3A.

As will be appreciated by those skilled in the art, micro-positioning devices include a wide variety of motors. The linear displacement motors (i.e., with hydraulic boosters included) shown in FIGS. 2A and 3A are only specific examples of the invention. Other types of micro-positioning motors, such as micro-positioning devices adapted for displacement radially outwardly from a central axis, are known, and could be modified to include the hydraulic booster of the invention to increase the displacement. The hydraulic booster of the invention could be used in any of the different types of micro-positioning devices, to modify the displacements thereof, and the invention includes all such micro-positioning devices.

Preferably, the fluid 60 is glycol. However, any suitable fluid, i.e., suitable for use in hydraulic cylinders, could be used, as would be appreciated by those skilled in the art.

The resilient elements 70, 72 and 170, 172 preferably comprise rubber or any other suitable material. A hydraulic booster could have a unibody construction—i.e., it could comprise only a wall portion defining a cavity with fluid therein—but if so, then the parts of the wall which correspond in that structure to the input pistons 64, 164 (and the resilient elements 70, 170) and the output pistons 66, 166 (and the resilient elements 72, 172) respectively would have sufficient flexibility to absorb mechanical energy (i.e., upon activation of the middle actuator 52 in the case of the input piston, or pressure from the fluid, in the case of the output piston).

In the preferred embodiment, the actuators comprise piezoelectric materials. However, as would be appreciated by those skilled in the art, any suitable smart material could be used.

As will also be appreciated by those skilled in the art, in the invention, the output force produced by the hydraulic booster's output piston 66 is less than the input force, i.e., the force input via the input piston 64. In general, due to losses, the work done by the hydraulic booster (product of output force and output displacement) will be less than the work done on the hydraulic booster (product of input force and input displacement).

It will be evident to those skilled in the art that the invention can take many forms, and that such forms are within the scope of the invention as claimed. For example, the hydraulic booster can be used in any micro-positioning device and with one or more actuators comprising any smart material. Therefore, the spirit and scope of the appended claims should not be limited to the descriptions of the versions contained herein.

We claim:

1. A micro-positioning device adapted for movement along a guideway, the device comprising:
   a frame comprising first and second opposing ends and a middle portion positioned therebetween;
   at least three actuators, two of said at least three actuators being attached to the frame at the first and second ends thereof respectively, one of said at least three actuators being positioned in the middle portion of the frame, said at least three actuators being adapted for activation and de-activation in synchronism to achieve a linear displacement of the device in a direction of travel along the guideway;
   at least two clamps, each of said at least two clamps being positioned respectively at the first and second ends of the frame and operably connected respectively to the actuators positioned at the opposing ends, each of said at least two clamps being adapted for clamping to the guideway upon activation of the actuator connected thereto respectively and for releasing upon de-activation thereof; and
   at least one hydraulic booster attached to the frame and connected to said middle actuator, said at least one hydraulic booster being adapted for converting mechanical energy into hydraulic energy when the middle actuator is activated and converting said hydraulic energy into mechanical energy to modify the displacement.

2. A micro-positioning device according to claim 1 in which the hydraulic booster comprises a fluid in a cavity defined by at least two opposing pistons and at least one wall portion, each of said pistons being connected to said at least one wall portion by at least one resilient element respectively such that activation of the middle actuator deforms said at least one resilient element connecting said piston adjacent to said actuator.

3. A micro-positioning device according to claim 2 in which one of said at least two pistons is an input piston positioned adjacent to the middle actuator and one of said at least two pistons is an output piston positioned distal from the middle actuator and in which the area of the input piston in contact with the fluid is substantially greater than the area of the output piston in contact with the fluid, such that activation of the middle actuator causes amplification of the displacement.

4. A micro-positioning device according to claim 2 in which one of said at least two pistons is an input piston positioned adjacent to the middle actuator and one of said at least two pistons is an output piston positioned distal from the middle actuator and in which the area of the input piston in contact with the fluid is substantially less than the area of the output piston in contact with the fluid, such that activation of the middle actuator causes de-amplification of the displacement.

5. A micro-positioning device adapted for movement in a direction of travel along a guideway, the device comprising:
   a frame comprising first and second opposing ends and a middle portion positioned therebetween;
   at least first and second actuators attached to the frame at the first and second ends of the frame respectively, each of said first and second actuators comprising a clamp operably connected thereto respectively adapted for clamping to the guideway upon activation of said actuator connected thereto respectively and for releasing upon de-activation thereof;
   at least one middle actuator attached to the frame in the middle portion thereof;
   said at least three actuators being adapted for activation and de-activation in synchronism to achieve a displacement in the direction of travel; and
   at least one hydraulic booster attached to the frame and operably connected to the middle actuator, said at least one hydraulic booster being adapted for converting mechanical energy into hydraulic energy when the middle actuator is activated and converting said hydraulic energy into mechanical energy to modify the displacement.

6. A micro-positioning device according to claim 5 in which said at least one hydraulic booster comprises a housing comprising an inner cavity containing a fluid, the inner cavity being defined by an input piston positioned adjacent to the middle actuator and an output piston positioned distal to said at least one middle actuator and at least one wall portion, the input piston being connected to said at least one wall portion by a first resilient element and the output piston being connected to said at least one wall portion by a second resilient element, the input piston comprising an input piston area in contact with the fluid and the output piston comprising an output piston area in contact with the fluid, said input piston area being greater than said output piston area, such that activation of the middle actuator deforms the first and second resilient elements from static positions to deformed positions, storing elastic energy therein, the first and second resilient elements returning to the static positions upon release of said elastic energy.

7. A micro-positioning device according to claim 6 in which each said resilient element comprises a rubber mount.

8. In a micro-positioning device adapted for displacement along a guideway in a direction of travel, the device comprising a frame comprising first and second opposing ends and a middle portion positioned therebetween, at least first and second actuators attached to the frame at the first and second ends of the frame respectively, each of said first and second actuators comprising a clamp operably connected thereto respectively adapted for clamping to the guideway upon activation of said actuator connected thereto respectively and for releasing upon de-activation thereof, at least one middle actuator attached to the frame in the middle portion thereof said at least three actuators being adapted for activation and de-activation in synchronism to achieve a displacement in the direction of travel, the improvement in which the device comprises at least one hydraulic booster attached to the frame and to said at least one middle actuator and adapted for converting mechanical energy into hydraulic energy and converting said hydraulic energy into mechanical energy upon activation of said at least one middle actuator to modify the displacement.

9. A micro-positioning device for incremental movement along a guideway, the device comprising:
   a frame comprising first and second opposing ends and a middle portion positioned therebetween;
   at least three actuators, two of said at least three actuators being coupled to the frame at first and second ends thereof respectively, one of said at least three actuators being a middle actuator positioned in the middle portion;
   each of said at least three actuators being activatable to an activated state, in which each said actuator has an activated configuration;
   one of said actuators being a first actuator positioned at the first end of the frame and another of said actuators being a second actuator positioned at the second end of the frame;
   at least two clamps, each of said at least two clamps being operable between a clamped state, in which said clamp is clamped to the guideway to maintain the micro-positioning device stationary relative to the guideway, and a released state, in which the device is movable relative to the guideway;
   each of said at least two clamps being coupled to one of the first and second actuators respectively such that, upon activation of one of said actuators, each said clamp is in the clamped state, and upon de-activation of said respective actuator, each said clamp is in the released state;
   said at least three actuators being adapted for activation and de-activation in synchronism to achieve a linear displacement of the device in a direction of travel along the guideway;
   at least one hydraulic booster coupled to the frame and positioned between said middle actuator and said second actuator; and
   said at least one hydraulic booster being adapted to convert mechanical energy resulting from the activation of the first actuator and the middle actuator in series into hydraulic energy and converting said hydraulic energy into mechanical energy to modify the displacement.

10. A micro-positioning device according to claim 9 in which the hydraulic booster comprises:
a body comprising a cavity;
a fluid in the cavity;
an input piston coupled to said middle actuator and comprising a contact area in communication with the fluid, the input piston being adapted to transmit mechanical energy resulting from activation of said middle actuator to the fluid;
an output piston comprising a contact area in communication with the fluid, the output piston being adapted to convert fluid energy to mechanical energy;
the contact area of the input piston being substantially greater than the contact area of the output piston;
the mechanical energy resulting from the movement of the fluid against the input piston contact area being greater than the mechanical energy resulting from the activation of said middle actuator, such that displacement of the device is increased.

11. A micro-positioning device according to claim 9 in which the hydraulic booster comprises:
a body comprising a cavity;
a fluid in the cavity;
an input piston coupled to said middle actuator and comprising a contact area in communication with the fluid, the input piston being adapted to transmit mechanical energy resulting from activation of said middle actuator to the fluid;
an output piston comprising a contact area in communication with the fluid, the output piston being adapted to convert fluid energy to mechanical energy;
the contact area of the input piston being substantially less than the contact area of the output piston;
the mechanical energy resulting from the movement of the fluid against the input piston contact area being greater than the mechanical energy resulting from the activation of said middle actuator, such that displacement of the device is decreased.

12. A micro-positioning device adapted for movement in a direction of travel along a guideway, the device comprising:
a frame comprising first and second opposing ends and a middle portion positioned therebetween;
at least first and second actuators attached to the frame at the first and second ends of the frame respectively, each of said first and second actuators comprising a clamp operably connected thereto respectively adapted for clamping to the guideway upon activation of said actuator connected thereto respectively and for releasing upon de-activation thereof;
at least one middle actuator attached to the frame in the middle portion thereof;
said at least three actuators being adapted for activation and de-activation in synchronism to achieve a displacement in the direction of travel; and
at least one hydraulic booster attached to the frame, said at least one hydraulic booster comprising:
a housing comprising an inner cavity;
a fluid in the inner cavity;
the housing comprising an input portion connected to said at least one middle actuator;
the input portion comprising an input contact area in communication with the fluid, the input portion being adapted to convert mechanical energy imparted from said at least one middle actuator into fluid energy in the fluid;
the housing comprising an output portion with an output contact area in communication with the fluid, the output portion being adapted to convert fluid energy in the fluid to mechanical energy;
the input contact area differing substantially from the output contact area,
whereby, upon activation of said at least one middle actuator, mechanical energy is imparted to the input portion and converted to fluid energy and fluid energy is converted by the output portion into mechanical energy to modify the displacement.

13. In an inchworm mechanism adapted for incremental movement along a guideway in a direction of travel, the mechanism comprising a frame comprising first and second opposing ends and a middle portion positioned therebetween, at least first and second actuators attached to the frame at the first and second ends thereof respectively, each of said first and second actuators comprising a clamp coupled therewith respectively adapted for clamping to the guideway upon activation of said respective actuator connected thereto and for releasing upon de-activation thereof, at least one middle actuator attached to the frame in the middle portion thereof, said at least three actuators being adapted for activation and de-activation in synchronism to achieve a displacement in the direction of travel, the improvement in which the device comprises at least one hydraulic booster attached to the frame adjacent to said at least one middle actuator and adapted for converting mechanical energy into hydraulic energy when the middle actuator is activated and converting said hydraulic energy into mechanical energy to modify the displacement.

14. A micro-positioning device adapted for displacement in at least one direction of travel, the device comprising;
a frame;
at least three actuators attached to the frame and adapted for activation and de-activation in sequence to effect said displacement;
at least one hydraulic booster attached to the frame and operably connected to at least one of said actuators, said at least one hydraulic booster being adapted for converting mechanical energy into hydraulic energy and converting said hydraulic energy into mechanical energy upon activation of said at least one of said actuators to modify the displacement;
said at least one hydraulic booster comprising a housing and a fluid in a cavity defined by the housing, the housing comprising at least one input portion adjacent to said at least one actuator, said at least one input portion being adapted to cooperate with the fluid to convert mechanical energy produced by said at least one of said actuators upon activation thereof into hydraulic energy;
the housing additionally comprising at least one output portion adapted to convert said hydraulic energy into mechanical energy to modify the displacement; and
said at least one input portion comprising an input contact area over which said at least one input portion is in contact with the fluid and said at least one output portion comprising an output contact area over which said at least one output portion is in contact with the fluid, the input contact area being substantially less than the output contact area,
whereby the hydraulic booster is adapted to de-amplify the displacement.

* * * * *